(12) United States Patent
Faetani et al.

(10) Patent No.: US 10,061,021 B2
(45) Date of Patent: Aug. 28, 2018

(54) CLUTTER FILTER CONFIGURATION FOR SAFETY LASER SCANNER

(71) Applicant: Datalogic IP Tech, S.r.l., Bologna (IT)

(72) Inventors: Sara Faetani, Bologna (IT); Francesca Cappa, Bologna (IT); Enrico Lorenzoni, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 15/203,531

(22) Filed: Jul. 6, 2016

(65) Prior Publication Data

US 2018/0011175 A1 Jan. 11, 2018

(51) Int. Cl.
| | |
|---|---|
| *G01S 7/497* | (2006.01) |
| *G01S 17/02* | (2006.01) |
| *G01S 7/481* | (2006.01) |
| *G05B 9/02* | (2006.01) |

(52) U.S. Cl.
CPC ............ *G01S 7/497* (2013.01); *G01S 7/4817* (2013.01); *G01S 17/02* (2013.01); *G05B 9/02* (2013.01)

(58) Field of Classification Search
CPC ........ G01S 7/497; G01S 7/4817; G01S 17/02; G05B 9/02
See application file for complete search history.

(56) References Cited

U.S. PATENT DOCUMENTS

| | | |
|---|---|---|
| 4,687,282 A | 8/1987 | Ferrante |
| 5,202,784 A | 4/1993 | Reddersen |
| 5,337,189 A | 8/1994 | Krawczyk et al. |
| 5,455,669 A | 10/1995 | Wetteborn |
| 6,491,222 B1 | 12/2002 | Dvorkis et al. |
| 7,280,211 B2 | 10/2007 | Horibe et al. |

(Continued)

FOREIGN PATENT DOCUMENTS

| | | |
|---|---|---|
| CN | 101916357 A | 12/2010 |
| CN | 106324582 A | 1/2017 |

(Continued)

OTHER PUBLICATIONS

Corrain et al., "Laser Scanner and Optical System," U.S. Appl. No. 15/145,532, filed May 3, 2016, 47 pages.

(Continued)

*Primary Examiner* — Harry W Byrne
*Assistant Examiner* — Ajay Ojha
(74) *Attorney, Agent, or Firm* — Seed Intellectual Property Law Group LLP

(57) ABSTRACT

A clutter filter configuration tool for a safety laser scanner. The clutter filter configuration tool may first operate the safety laser scanner in an environment to learn the environmental clutter level and present the same to a user. Subsequent to this "teach-in" phase, the configuration tool may provide a clutter filter selection process which presents the environmental clutter level to the user and allows the user to select a suitable configuration for a clutter filter. The configuration tool may also provide a clutter filter simulation process wherein the clutter filter chosen by the user is verified and a test is performed using the selected clutter filter. The results may be reported on a visualized graph. The configuration tool may also determine a real area to be monitored utilizing a floor projection area and an orientation of the laser scanner.

25 Claims, 10 Drawing Sheets

(56) References Cited

U.S. PATENT DOCUMENTS

| | | | |
|---|---|---|---|
| 7,880,865 B2 | 2/2011 | Tanaka et al. | |
| 7,965,384 B2 | 6/2011 | Drinkard | |
| 8,319,171 B2 | 11/2012 | Kawabata | |
| 8,330,095 B2 | 12/2012 | Kawabata | |
| 8,625,080 B2 | 1/2014 | Heizmann et al. | |
| 8,724,096 B2 | 5/2014 | Gosch et al. | |
| 8,902,409 B2 | 12/2014 | Sigmund et al. | |
| 2002/0143506 A1 | 10/2002 | D'Aligny et al. | |
| 2005/0168720 A1* | 8/2005 | Yamashita | G01S 7/4817 356/4.01 |
| 2005/0205755 A1 | 9/2005 | Walsh et al. | |
| 2008/0316310 A1* | 12/2008 | Braune | F16P 3/14 348/143 |
| 2009/0002678 A1 | 1/2009 | Tanaka et al. | |
| 2009/0086189 A1 | 4/2009 | Drinkard | |
| 2010/0198365 A1* | 8/2010 | Kawabata | G01S 7/4812 700/12 |
| 2011/0077814 A1 | 3/2011 | Haberer | |
| 2012/0026466 A1 | 2/2012 | Zhou et al. | |
| 2013/0250302 A1 | 9/2013 | Kramer | |
| 2013/0256418 A1 | 10/2013 | Havens et al. | |
| 2014/0166866 A1 | 6/2014 | Gehring et al. | |
| 2017/0322074 A1 | 11/2017 | Corrain et al. | |
| 2017/0322075 A1 | 11/2017 | Lorenzoni et al. | |

FOREIGN PATENT DOCUMENTS

| | | |
|---|---|---|
| DE | 103 26 848 A1 | 1/2005 |
| DE | 20 2009 015 194 U1 | 3/2010 |
| DE | 10 2012 102 244 A1 | 10/2012 |
| DE | 10 2012 112 987 B3 | 12/2013 |
| DE | 20 2013 101 807 U1 | 7/2014 |
| EP | 1 562 055 A2 | 8/2005 |
| EP | 1 617 205 A1 | 1/2006 |
| EP | 1 617 206 A1 | 1/2006 |
| EP | 1 666 913 A2 | 6/2006 |
| EP | 1 965 225 A2 | 9/2008 |
| EP | 2 237 063 A1 | 10/2010 |
| EP | 2 375 264 B1 | 5/2012 |
| EP | 2 447 733 A1 | 5/2012 |
| EP | 2 378 309 B1 | 7/2012 |
| EP | 2 541 273 B1 | 5/2013 |
| EP | 2 624 016 A1 | 8/2013 |
| EP | 2 950 115 A1 | 12/2015 |
| EP | 3 242 145 A1 | 11/2017 |
| EP | 3 246 729 A1 | 11/2017 |
| JP | 62-254008 A | 11/1987 |
| WO | 97/22945 A1 | 6/1997 |
| WO | 03/087875 A1 | 10/2003 |

OTHER PUBLICATIONS

Elmer, "The Optical Design of Reflectors." New York, NY, John Wiley & Sons, 1980, pp. 72-75.

Lorenzoni et al., "Laser Scanner With Reduced Internal Optical Reflection," U.S. Appl. No. 15/145,545, filed May 3, 2016, 30 pages.

Omron Corporation, "Safety Laser Scanner 0S32C Series—User's Manual," Manual No. Z296-E1-10, Mar. 2015, 179 pages.

Rigoni, "Laser scanner and related receiving optical system," Datalogic Invention Disclosure Form, Jan. 14, 2016, 15 pages.

SICK Sensor Intelligence, "microScan3—The New Generation of Safety Laser Scanners," Feb. 29, 2016, 28 pages.

SICK Sensor Intelligence, "Safety Designer—Configuration software—Installation and operation," Feb. 5, 2016, 32 pages.

Zhao, "Practical Reflector Design and Calculation for General Illumination," *Proceedings of SPIE 5942, Nonimaging Optics and Efficient Illumination Systems II*, San Diego, CA, Jul. 31, 2005, 9 pages.

European Search Report, dated Aug. 18, 2017, for European Application No. 17 16 9258, 2 pages.

Extended European Search Report, dated Oct. 23, 2017, for European Application No. 17169257.7-1812, 6 pages.

International Search Report, dated Oct. 12, 2017, for International Application No. PCT/IT2017/000094, 12 pages.

Office Action, dated Sep. 22, 2017, for U.S. Appl. No. 15/145,532, Corrain et al., "Laser Scanner and Optical System," 11 pages.

Extended European Search Report, dated Nov. 30, 2017, for European Application No. 17179849.9-1812, 8 pages.

\* cited by examiner

CLUTTER FILTER CONFIGURATION FOR SAFETY LASER SCANNER

BACKGROUND

Technical Field

The present disclosure generally relates to optical sensors, and more particularly, to laser scanners and configuration tools for laser scanners.

Description of the Related Art

Optical sensors are currently used in a number of applications for the detection of objects. One type of optical sensor is a laser scanner, in which a collimated light beam generated by a laser source periodically moves over an area to be scanned or monitored. The light beam may be moved by a scanning mirror or other deflection unit which rotates or oscillates to direct light beams over the area. Using the angular position of the scanning mirror, the angular position of an object may be determined. Using the time of flight for pulses of light reflected by an object and the speed of light, the distance of an object may also be determined. From the angular and distance measurements, objects may be detected in the area in two-dimensional polar coordinates, for example.

In addition to object measurement applications, laser scanners may also be used in safety applications for monitoring a source of danger, such as a machine. In such safety applications, a laser scanner may be positioned to monitor an area proximate the source of danger which should not be entered by personnel. If a person or object enters the monitored area when the laser scanner is active, the laser scanner may generate an alarm and/or mitigate the source of danger (e.g., cause shutdown of a running machine).

FIG. 1 shows a schematic sectional view of a laser scanner 10 described in U.S. Pat. Pub. No. 2013/0003041. In operation, a light source 12, such as a laser diode, emits a collimated beam 14 in the form of short (e.g., few nanoseconds) pulses toward a bending or folding mirror 16, which reflects the beam toward a scanning mirror 18, which directs the beam toward a scanning area 20. If an object is present in the scanning area 20, the diffuse light 22 that is back-reflected by the object is reflected by the scanning mirror 18, collected by a collecting lens 24 and detected by a light detector 26 (e.g., a photodiode).

A motor 28 may be operatively coupled to the scanning mirror 18 to drive the scanning mirror in continuous rotation about a vertical axis of rotation. The angular position of the scanning mirror 18 may be detected by an angular position detector 30, such as an encoder. The light beam 14 generated by the light source 12 therefore scans the scanning area 20 generated by the rotational movement. In instances where there is an object in the scanning area 20 and a reflected light signal is detected by the light detector 26, the angular position of the object in the scanning area may be derived from the angular position of the scanning mirror 18, as detected by the angular position detector 30.

The time of flight of individual laser light pulses from their transmission until the reception after reflection by the object in the scanning area 20 may be determined, which allows for calculation of the distance of the object from the laser scanner 10 based on the known speed of light. This evaluation may be performed by a controller 32 which is operatively coupled to the light source 12, the light detector 26, the motor 28, and/or the angular position detector 30. The components of the laser scanner 10 may be arranged in a housing 34 which includes a protective window 36 in the area where light enters and leaves the laser scanner.

Safety laser scanners are often used in environments which are polluted with dust, fog, debris, etc., referred to herein generally as clutter. Such clutter may be detected by a safety laser scanner and interpreted as an actual object (e.g., person), thereby triggering a false alarm. To prevent such undesirable behavior, safety laser scanners may be equipped with a clutter filter which filters or removes clutter signals from the output of the laser scanner so that the clutter is ignored, thereby reducing or eliminating false alarms caused by the presence of clutter within a monitoring area of the scanner. The behavior of the safety laser scanner in a polluted environment may depend on the particular type and amount of clutter (e.g., dust type, fog, debris) present in the environment, which makes it difficult to select an appropriate clutter filter for a particular environment without knowing the particular type and/or amount of clutter in the environment.

BRIEF SUMMARY

A method of operating a laser scanner configuration system to configure a clutter filter of a laser scanner may be summarized as including receiving, by at least one processor via a user interface, operational parameters for the laser scanner, the operational parameters comprising at least a maximum detection distance, a response time, and a detection capability of the laser scanner; receiving, by the at least one processor via the user interface, an indication of whether at least one of the operational parameters of the laser scanners is permitted to be autonomously modified; and responsive to receiving an indication that at least one of the operational parameters is permitted to be autonomously modified, causing, by at least one processor, the laser scanner to operate in an environment for a period of time; receiving, by the at least one processor, detection data from the laser scanner, the detection data obtained by the laser scanner during operation thereof during the period of time; and optimizing, by the at least one processor, clutter filter parameters of a clutter filter of the laser scanner utilizing the received detection data, wherein optimizing the clutter filter parameters of the clutter filter comprises modifying at least one of the operational parameters which is permitted to be autonomously modified; and presenting, by the at least one processor via the user interface, the modified operational parameters.

The method may further include simulating, by the at least one processor, performance of the laser scanner as configured with the modified operational parameters; and presenting, by the at least one processor via the user interface, data indicative of the results of the simulation.

The method may further include responsive to the presenting of data indicative of the results of the simulation, receiving, by the at least one processor via the user interface, a modification of at least one of the operational parameters.

The method may further include responsive to receiving a modification of at least one of the operational parameters, simulating, by the at least one processor, performance of the laser scanner configured with the modified operational parameters; and presenting, by the at least one processor via the user interface, data indicative of the results of the simulation.

The method may further include receiving, by the at least one processor via the user interface, teach-in phase duration data, the teach-in phase duration data indicative of a duration of the period of time the laser scanner is caused to operate in the environment. Optimizing clutter filter parameters of a clutter filter may include optimizing clutter filter parameters of a clutter filter which may include at least one of a temporal filter or a spatial filter.

The method may further include receiving, by the at least one processor via the user interface, a pause command while the laser scanner is operating in the environment during the period of time; and responsive to receiving the pause command, causing the laser scanner to cease operation in the environment. Optimizing clutter filter parameters of a clutter filter may include utilizing the received detection data from the laser scanner to assess a plurality of different combinations of clutter filter parameters for the clutter filter.

The method may further include receiving, by the at least one processor via the user interface, a set of orientation coordinates for the laser scanner; receiving, by the at least one processor via the user interface, a floor projection area value for the laser scanner indicative of the floor projection area to be monitored by the laser scanner; determining, by the at least one processor, a real area value to be monitored by the laser scanner based at least in part on the received set of orientation coordinates and the received floor projection area value; and presenting, by the at least one processor via the user interface, the determined real area value. Receiving a set of orientation coordinates may include receiving a plan angle, a vertical angle and a tilt angle of the laser scanner. Presenting the determined real area may include graphically presenting the determined real area on a display. Receiving a floor projection area value for the laser scanner may include receiving a graphical representation of a floor projection area value via a graphical user interface.

A laser scanner configuration system may be summarized as including at least one processor; and at least one non-transitory processor-readable storage medium communicatively coupled to the at least one processor and which stores at least one of processor-executable instructions or data that, when executed by the at least one processor, cause the at least one processor to: receive, via a user interface, operational parameters for a laser scanner, the operational parameters comprising at least a maximum detection distance, a response time, and a detection capability of the laser scanner; receive, via the user interface, an indication of whether at least one of the operational parameters of the laser scanners is permitted to be autonomously modified; and responsive to receipt of an indication that at least one of the operational parameters is permitted to be autonomously modified, cause the laser scanner to operate in an environment for a period of time; receive detection data from the laser scanner, the detection data obtained by the laser scanner during operation thereof during the period of time; and optimize clutter filter parameters of a clutter filter of the laser scanner utilizing the received detection data, wherein optimization of the clutter filter parameters of the clutter filter comprises a modification at least one of the operational parameters which is permitted to be autonomously modified; and present, via the user interface, the modified operational parameters. The at least one processor may simulate performance of the laser scanner as configured with the modified operational parameters; and present, via the user interface, data indicative of the results of the simulation. The at least one processor may, responsive to the presentation of data indicative of the results of the simulation, receive, via the user interface, a modification of at least one of the operational parameters. The at least one processor may, responsive to receipt of a modification of at least one of the operational parameters, simulate performance of the laser scanner configured with the modified operational parameters; and present, via the user interface, data indicative of the results of the simulation. The at least one processor may receive, via the user interface, teach-in phase duration data, the teach-in phase duration data indicative of a duration of the period of time the laser scanner is caused to operate in the environment. The clutter filter may include at least one of a temporal filter or a spatial filter. The at least one processor may receive, via the user interface, a pause command while the laser scanner is operating in the environment during the period of time; and, responsive to receipt of the pause command, cause the laser scanner to cease operation in the environment. The at least one processor may utilize the received detection data from the laser scanner to assess a plurality of different combinations of clutter filter parameters for the clutter filter. The at least one processor may receive, via the user interface, a set of orientation coordinates for the laser scanner; receive, via the user interface, a floor projection area value for the laser scanner indicative of the floor projection area to be monitored by the laser scanner; determine a real area value to be monitored by the laser scanner based at least in part on the received set of orientation coordinates and the received floor projection area value; and present, via the user interface, the determined real area value. Receiving a set of orientation coordinates may include receiving a plan angle, a vertical angle and a tilt angle of the laser scanner. Presenting the determined real area may include graphically presenting the determined real area on a display. Receiving a floor projection area value for the laser scanner may include receiving a graphical representation of a floor projection area value via a graphical user interface.

A method of operating a laser scanner configuration system to configure a clutter filter of a laser scanner may be summarized as including causing, by at least one processor, a laser scanner communicatively coupled to the at least one processor to operate in an environment for a period of time; receiving, by the at least one processor, detection data from the laser scanner, the detection data obtained by the laser scanner during operation thereof during the period of time; and optimizing, by the at least one processor, clutter filter parameters of a clutter filter of the laser scanner utilizing the received detection data, wherein optimizing the clutter filter parameters of the clutter filter comprises modifying at least one operational parameter of a plurality of operational parameters of the laser scanner, the plurality of operational parameters includes at least a maximum detection distance, a response time, and a detection capability of the laser scanner; presenting, by the at least one processor via a user interface, the modified operational parameters associated with the optimized clutter filter parameters; simulating, by the at least one processor, performance of the laser scanner as configured with the modified operational parameters; and presenting, by the at least one processor via the user interface, data indicative of the results of the simulation.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
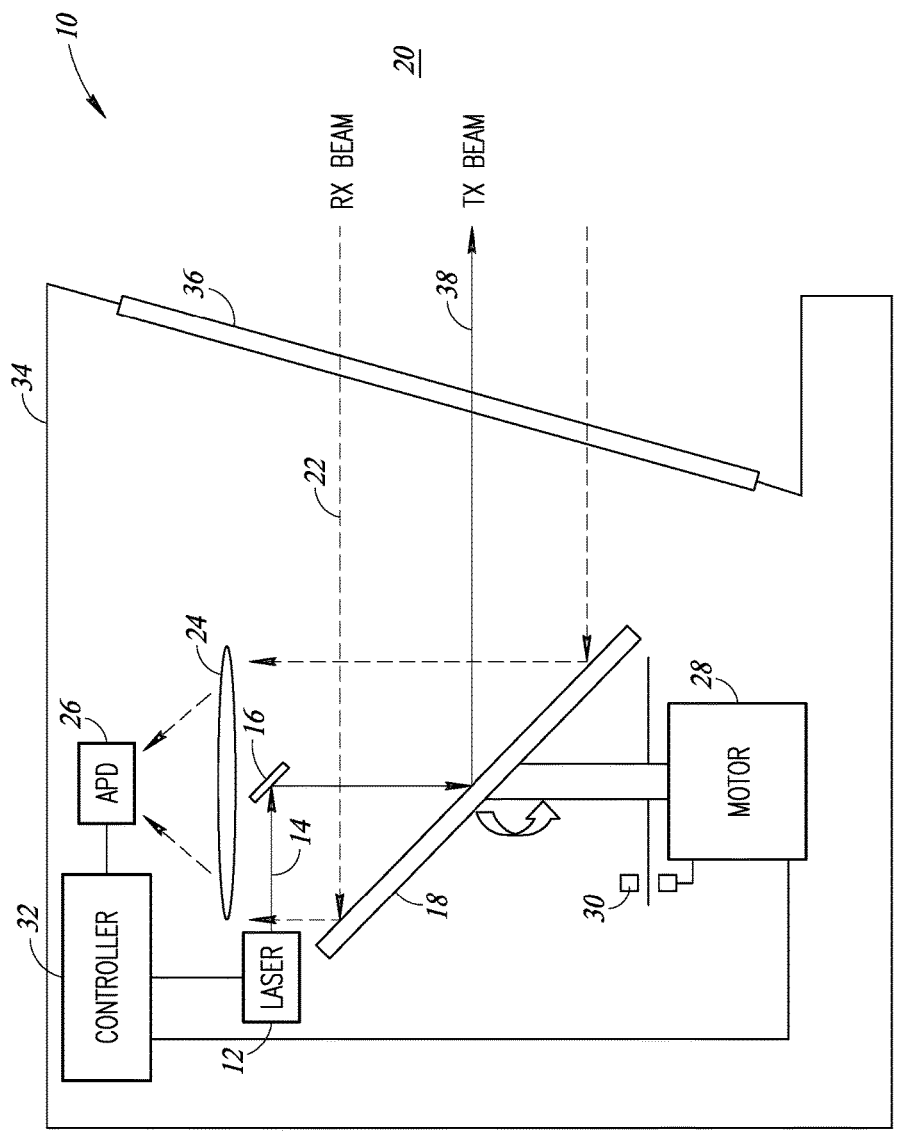
FIG. 1 is a schematic sectional view of a safety laser scanner.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to configuration tools for laser scanners which may be used in any number of applications, such as safety applications. The optical system of such laser scanners may include an emitting or transmission subsystem which scans a scanning area using a laser beam. The optical system may also include a reception subsystem which detects light (visible or nonvisible, more generally "electromagnetic radiation") scattered back by an object positioned inside the scanning area.

One or more implementations discussed herein provide a configuration tool for a laser scanner which includes a graphical user interface (GUI) that allows quick and easy setup for clutter filter parameter settings for a clutter filter of a laser scanner, which clutter filter may be used to reduce or eliminate signal noise produced by clutter (e.g., dust, fog, debris) present in a monitored area of the laser scanner. Because laser scanners may be configured to respond to a first object detected, such clutter generates false object detection, leading to unnecessary or inappropriate actions of a control circuit (e.g., shutting off a machine when no object is present in the monitored area).

To mitigate a laser scanner's susceptibility to clutter-related false detections, a laser scanner may be required to detect and track objects for a plurality of consecutive detection or scan times. Such technique may be referred to as temporal filtering. Another approach requires the laser scanner to detect an object on a plurality (e.g., two, four, eight) of adjacent beam angles or directions. This technique may be understood as a spatial or size-based qualification or filtering. Either of these techniques, or a combination thereof, may reduce false object detections associated with small particles present in a scanning field.

Due to differences in particular applications and environments, it can be difficult to select an appropriate clutter filter for a laser scanner which is used to reduce or eliminate noise caused by clutter. Generally a clutter filter is a filter which is based on temporal and/or spatial filters. A temporal filter provides a result after a number of scans (e.g., 2 scans, 8 scans). The response time of the laser scanner is proportional to the number of scans. Generally, the response time of the laser scanner is the maximum time between a first detection of an object and the switching of a safety output of the laser scanner which may be used to shut off a machine. As discussed further below, the response time of the laser scanner may be manually or autonomously configured. In some implementations, the response time for a laser scanner may be between 60 ms and 480 ms, for example.

A spatial filter gives a result which is a measure of near angles. The angular resolution and the detection capability of the laser scanner change with changes to the spatial filter. Generally, detection capability, also referred to herein as minimum object resolution, is the smallest width of an object the scanner will detect. Like the response time, the detection capability of a laser scanner may be manually or autonomously configured. For example, in some implementations the detection capability of a laser scanner may be set to 30 mm, 40 mm, 50 mm, 60 mm, 70 mm, 120 mm, etc., dependent on the number of consecutive beams (e.g., 2 beams, 10 beams, 100 beams) required to detect the presence of an object.

Another parameter of a laser scanner which may affect the suitable clutter filter parameters for a clutter filter is maximum range or maximum distance of the laser scanner. Generally, the maximum range of a laser scanner may be set by a user. For example, a particular laser scanner may have a maximum range settable between 0.1 m and 5.5 m. The maximum range of a laser scanner may be inversely related to the detection capability of the laser scanner.

As discussed in further detail below, implementations of the present disclosure provide a configuration tool for a safety laser scanner which includes a graphical user interface (GUI) that allows users to select an optimum clutter filter for their particular application by modifying a temporal filter and/or a spatial filter of a clutter filter. To simplify the selection of appropriate filters, the graphical user interface of the configuration tool may provide clutter filter selection functionality, as well as clutter filter simulation functionality. During selection of the clutter filter, the configuration tool may autonomously select the best clutter filter for use in a particular environment. In some implementations, the user is presented with various on-screen adjustable parameters to have the laser scanner achieve a desired response time, maximum operating distance, and detection capability. Base on this choice, the user may be provided with a simulation of the performance of the laser scanner in the environment when configured with the specified parameters. In some implementations, the user may allow the configuration tool to have the freedom to vary one or more of the parameters in order to autonomously adjust to an optimum set of operational parameters, after which the user may again be presented with the simulation results so as to decide if the user is satisfied with the results.

Different types of clutter filters may be chosen by giving priority to one or more of the adjustable parameters. By imposing one of the three parameters, the configuration tool may optimize on the fixed parameter(s) leaving the other parameters to be sub optimal. During simulation, the configuration tool may test one or more clutter filters selected by a user.

Generally, during one or more configuration steps, the user may choose a level of clutter tolerance for particular application. As noted above, there may be different levels of clutter tolerance, and the selection of clutter filter parameters for a clutter filter changes the response time and detection capability of the laser scanner.

Initially, a laser scanner which may be configured by the configuration tools of the present disclosure is discussed with reference to FIGS. 2 and 3A-3B. Then, implementations of the configuration tools of the present disclosure are discussed with reference to FIGS. 4-10.

Figure 2:
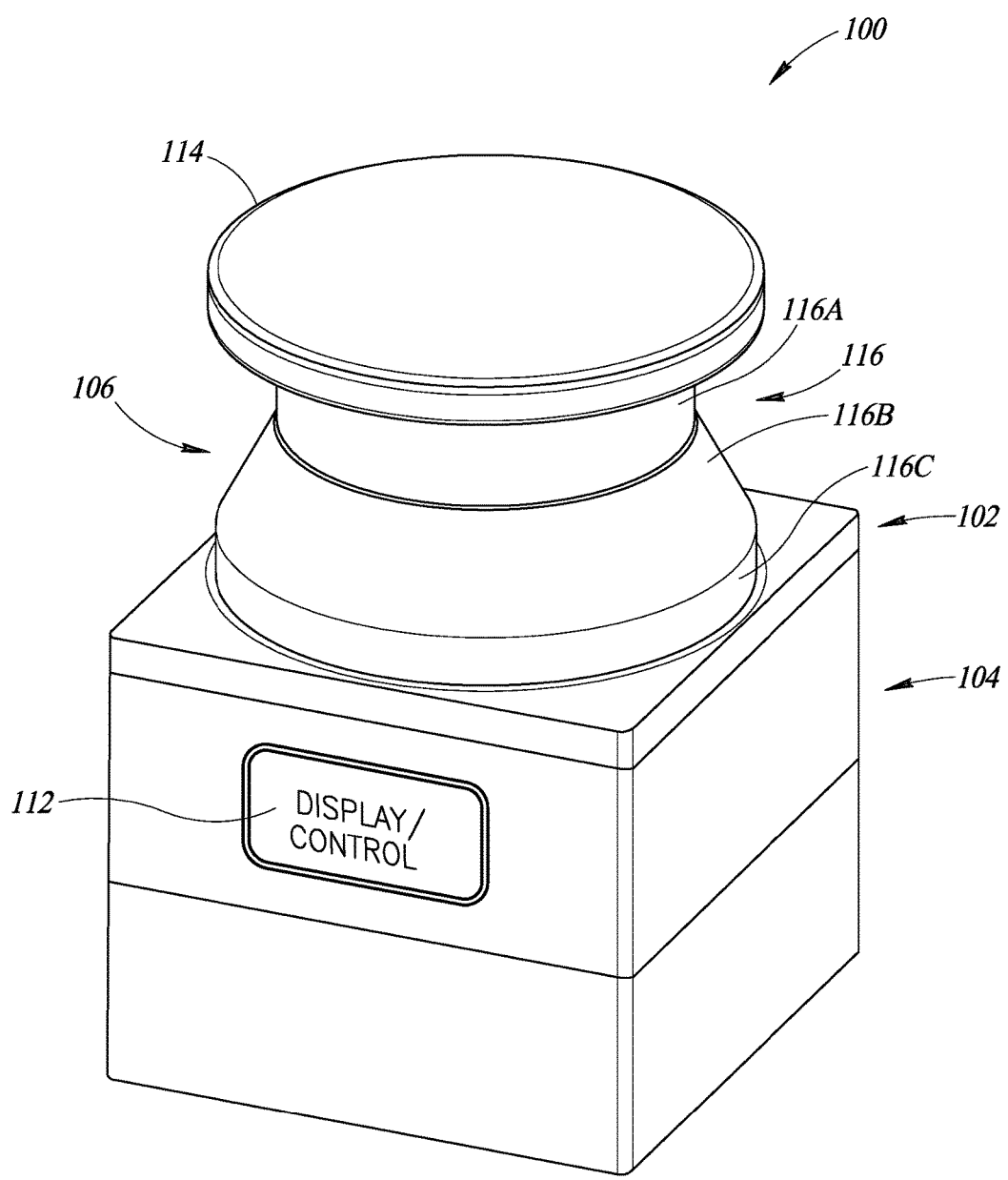
FIG. 2 is an isometric view of a laser scanner, according to one illustrated implementation.

Referring to FIG. 2, a laser scanner 100 is shown, according to one illustrated implementation. The laser scanner 100 includes a housing 102 which includes a lower housing portion 104 and an upper housing portion 106. Each of the lower housing portion 104 and the upper housing portion 106 may include respective interior chambers 108 and 110 (FIG. 3A) for containing one or more components of the laser scanner 100 therein. The lower housing portion 104 may include a display/control panel 112 which provides a user interface comprising one or more inputs (e.g., button, knob, touchscreen) and one or more outputs (e.g., screen, light, audio).

The upper housing portion 106 may include circular-shaped brim 114 (also referred to as an eave or overhang) disposed over a protective window 116 which is positioned in an area where light enters and leaves the laser scanner 100. The protective window 116 may be made of a plastic material (e.g., polycarbonate, other polymer material) which has a high transmittance of light for wavelengths which are emitted by a light source 118 (FIGS. 3A-3B) of the laser scanner 100. In some implementations, the visual appearance of the window 116 may be black, which filters visible light and which hides the internal components of the laser scanner 100. The window 116 may have rotation symmetry about a vertical axis of rotation of the scanning mirror 128 of the laser scanner.

In some implementations, the protective window 116 has a profile which is divided into an upper section 116A, a middle section 116B, and a lower section 116C. The middle section 116B of the protective window 116 may be tilted with a relatively large angle (e.g., 30 degrees, 45 degrees) with respect to a vertical rotation axis. In the example shown, the upper section 116A and lower section 116C of the protective window 116 are cylindrical in shape. The middle section 116B is in the shape of a frustum of a cone ("frustoconical") which flares outward and downward between the upper section 116A and the lower section 116C. In some implementations, the middle section 116B may have a profile of a frustum of a cone having an semi-apex angle which is greater than or equal to 30 degrees and less than or equal to 45 degrees, for example. At least a portion of one or both of the inner and outer surfaces of the protective window 116 may be coated with one or more anti-reflective coatings, which reduces reflection of the diffusive component and/or the reflective component of internally scattered light.

Figure 3A:
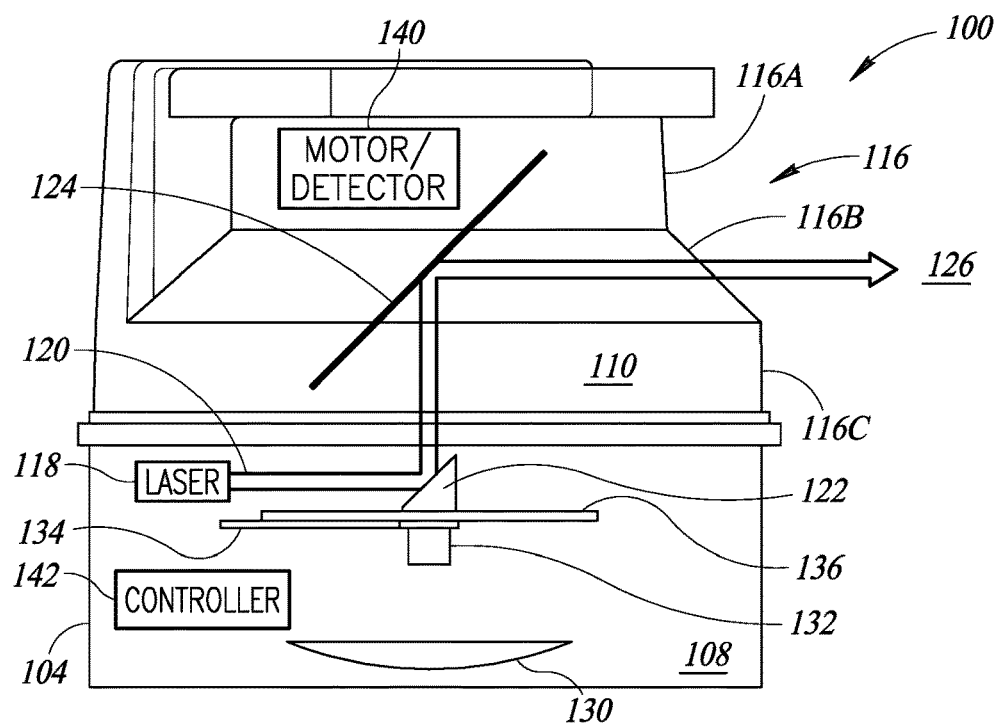
FIG. 3A is a schematic sectional view of a laser scanner showing a transmission period of the laser scanner, according to one illustrated implementation.
Figure 3B:
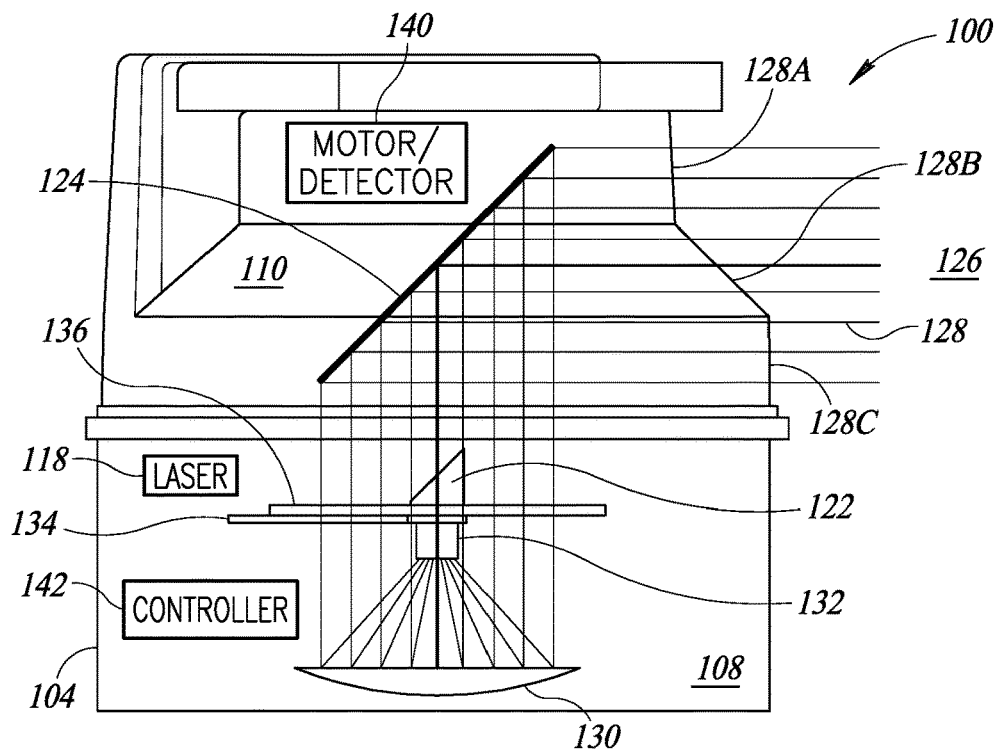
FIG. 3B is a schematic sectional view of the laser scanner of FIG. 3A showing a reception period of the laser scanner, according to one illustrated implementation.

Referring to FIGS. 3A and 3B, schematic sectional views of the laser scanner 100 is shown. As shown in FIG. 3A, the laser scanner 100 includes a light source or emitter 118, such as a laser diode, that emits a collimated beam 120 in the form of short (e.g., few nanoseconds) pulses toward a bending or folding mirror 122, which reflects the beam toward a scanning mirror 124. The light source 118 may have an emission band in the near infrared (NIR) range and may have a peak wavelength of 905 nanometers, for example. The scanning mirror 124 directs the beam toward a scanning area 126.

As shown in FIG. 3B, if an object is present in the scanning area 126, diffuse light 128 that is back-reflected by the object is reflected by the scanning mirror 124, and directed downward toward collecting optics which include a concave collecting reflector or mirror 130. The collecting mirror 130 is positioned below the folding mirror 122 to direct and focus light from the scanning mirror 124 which has been reflected from one or more objects positioned within the scanning area 126 toward a light detector 132 (e.g., avalanche photodiode, other photodetector) which is supported by a support arm 134.

The collecting mirror 130 may be formed of a plastic material (e.g., polycarbonate (PC), polymethylmethacrylate (PMMA), cyclic olefin polymer (COP)) which has a one or more layers of a reflective coating thereon to provide a reflective surface. The reflective coating may include a metal layer such as aluminum or gold, optionally with a protective layer of a transparent material (e.g., $SiO_2$). Another example of a reflective coating is a dielectric multilayer coating that has a very high (e.g., 99%) reflectivity for a specific wavelength band. The collecting mirror 130 may be formed from a material with low water absorption properties which may reduce the likelihood that a reflective coating will peel off during the lifetime of the laser scanner 100. In some implementations, the collecting mirror 130 is opaque to wavelengths of light emitted by the light source 118 so that the small fraction of light which passes through the reflective surface is absorbed by the material and is not diffused inside the lower housing 104 of the laser scanner 100.

The laser scanner 100 also includes a dichroic or interference filter 136 positioned above (as shown) the light detector 132 to filter the returned light 128 from the scanning mirror 124 before the returned light reaches the collecting mirror 130. The interference filter 136 transmits spectral bands which correspond to the light emitted by the light source 118 and reflects spectral bands outside of the spectral band emitted by the light source. Since the interference filter 136 is placed in the optical path before the collecting mirror 130, the interference filter may be designed to accept rays with a relatively small incidence angle, such as an incidence angle of only a few degrees (e.g., 3 degrees, 5 degrees, 10 degrees, 20 degrees). By allowing the acceptance angle of the interference filter 136 to be relatively small, the interference filter may more effectively filter the scattered light from within the housing 104 of the laser scanner 100, thereby improving the signal to noise ratio.

The laser scanner 100 may also include a motor/detector 140 which is operatively coupled to the scanning mirror 124 to drive the scanning mirror in continuous rotation about a vertical axis of rotation. For example, in some implementations the scanning mirror 124 may rotate at an approximate speed of 2000 rotations per minute. The angular position of the scanning mirror 124 may be detected by the motor/detector 140, which may include an angular position detector such as an encoder. The light beam 120 generated by the light source 118 in the form of short pulses therefore scans the scanning area 126 generated by the rotational movement. In instances where there is an object in the scanning area 126 and a reflected light signal is detected by the light detector 132, the angular position of the object in the scanning area 126 may be derived from the angular position of the scanning mirror 124, as detected by the motor/detector 140.

The time of flight of individual laser light pulses from their transmission until the reception after reflection on the object in the scanning area 126 may be determined, which allows for calculation of the distance of the object from the laser scanner 100 based on the known speed of light. This evaluation may be performed by a controller 142 which is operatively coupled to the light source 118, the light detector 132, and/or the motor/detector 140.

The controller 142 may be any suitable controller, and may include one or more central processing units (CPUs), microprocessors, digital signal processors (DSPs), application-specific integrated circuits (ASICs), field programmable gate arrays (FPGAs), programmable logic controllers (PLCs), etc. The controller 140 may include or be operatively coupled to nontransitory processor-readable storage media (e.g., RAM, ROM, flash), input/output systems, wired/wireless communication systems, etc., as is known in the art.

Figure 4:
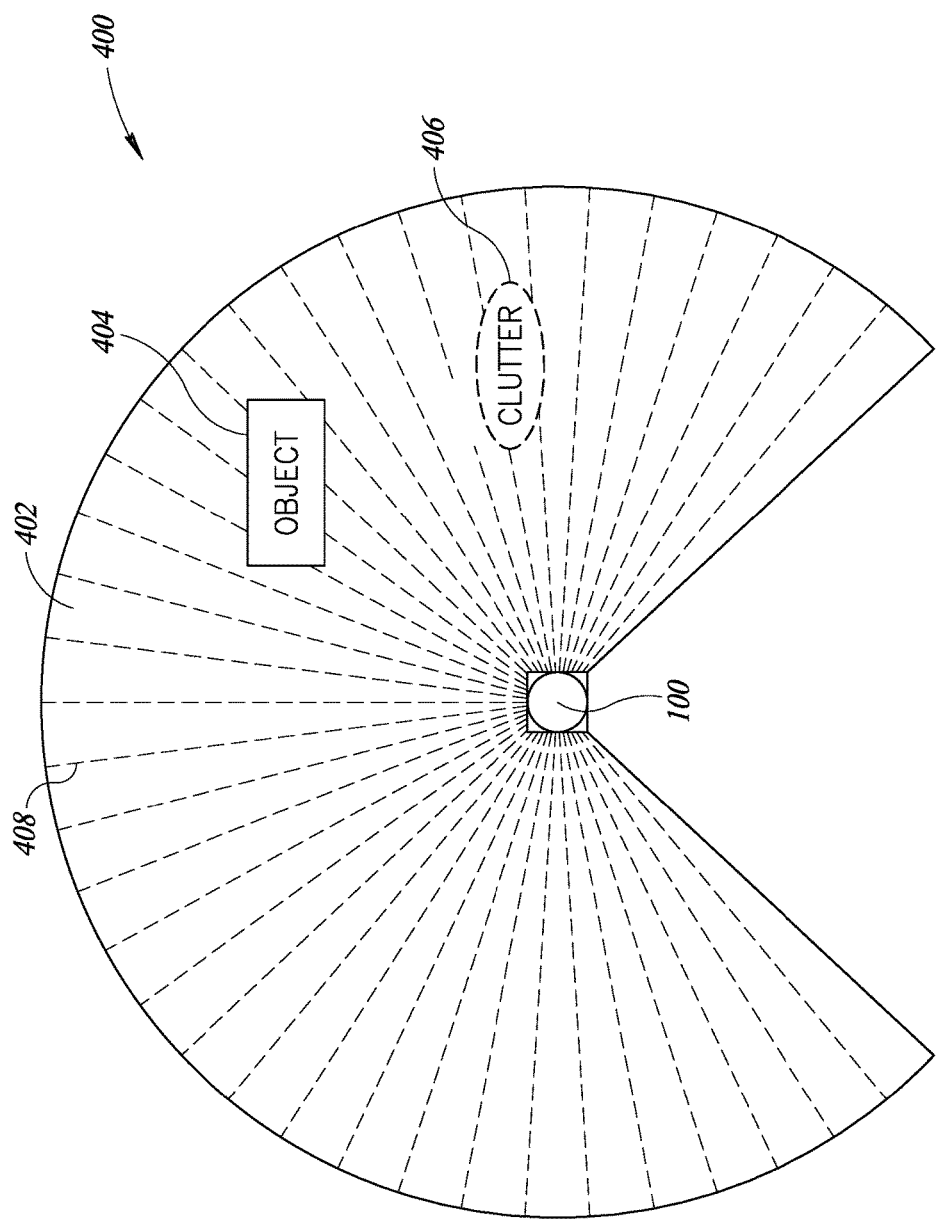
FIG. 4 is a schematic view of a monitoring area for a laser scanner which includes clutter and an object, according to one illustrated implementation.

FIG. 4 shows a schematic top plan view 400 of the laser scanner 100 in a monitored area 402 which includes an object 404 (e.g., a person) and clutter 406 (e.g., dust, fog). Although the clutter 406 is shown as being in a particular region of the monitored area 402, in some instances the clutter may be present throughout the monitored area (e.g., dust throughout a monitored area).

As described above, the laser scanner 100 operates to two-dimensionally scan the monitored area 402 with beams of light 408 and monitors light reflected from the monitored area 402 to detect objects therein. As discussed further below, the dimensions of the monitored area 402 may be configurable by a user, for example, during deployment of the laser scanner 100 in the monitored area 402.

The monitored area 402 is sized and shaped to correspond to a safety output for stopping the operation of a machine when, for example an object (e.g., object 404) enters the monitored area during operation of the machine. Although not shown, in some implementations, a warning area may be designated outside of the monitored area 402. In such implementations, the laser scanner 100 may detect objects within the warning area and provide an alert or warning (e.g., audible warning, visual warning) to the user to indicate to the user that the user is near the monitored or protection area 402 of the machine. In the example shown, the scanning angle of the laser scanner is approximately 270°, but it should be appreciated that in other implementations different scanning angles may be utilized.

Figure 5:
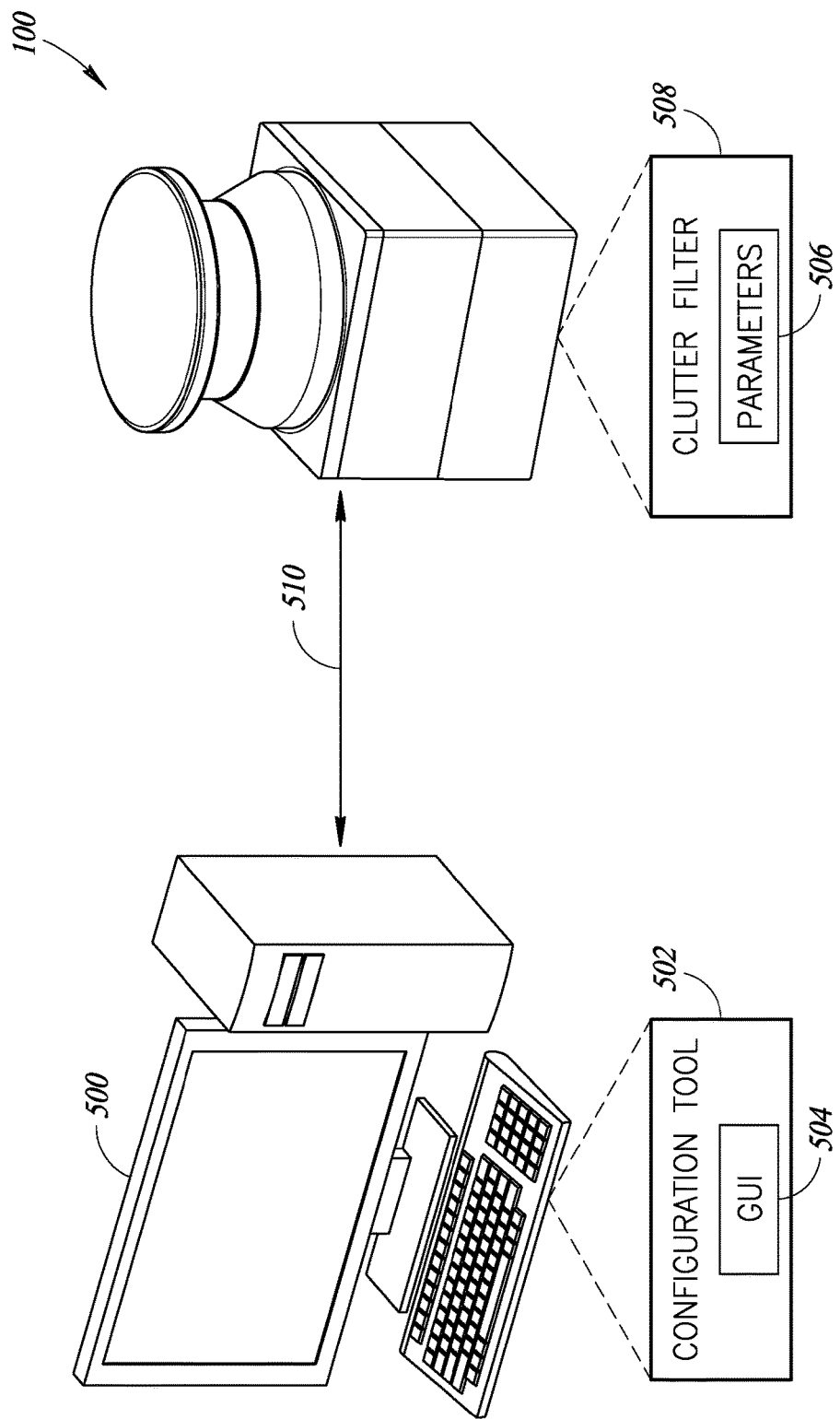
FIG. 5 is a schematic diagram of a laser scanner that is communicatively coupled to a laser scanner configuration system, according to one illustrated implementation.

FIG. 5 shows an example of a laser scanner configuration system 500 which includes a configuration tool or application 502 for configuring a laser scanner 100 to be used in a monitored area. The configuration tool 502 implements a graphical user interface 504 which allows the user to easily select clutter filter parameters 506 for a clutter filter 508 of the laser scanner 100. The laser scanner configuration system 500 may be communicatively coupled to the laser scanner 100 via any suitable wired and/or wireless communications channel 510.

Figure 6:
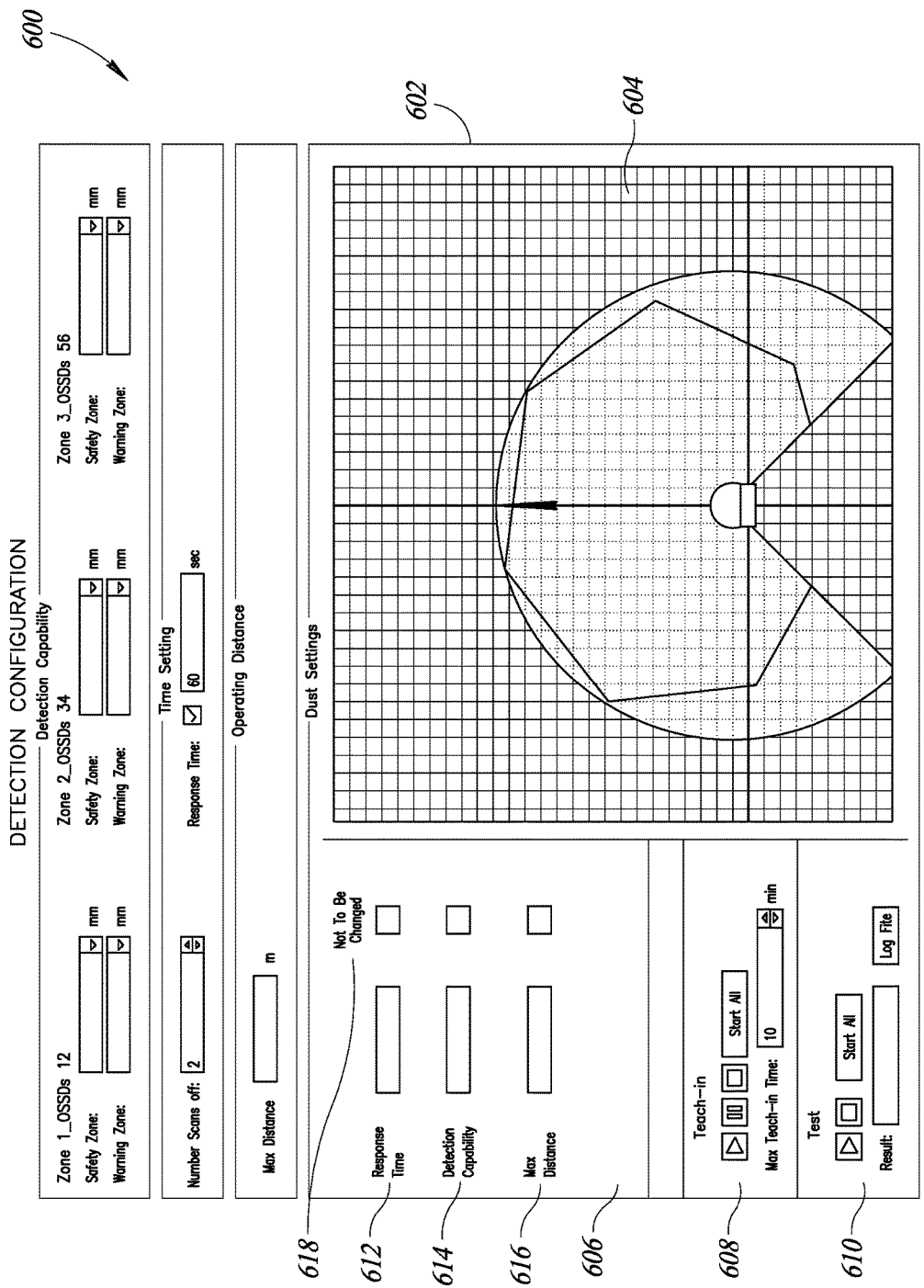
FIG. 6 is a screenshot of a user interface for a laser scanner configuration tool which allows a user to configure a clutter filter of the laser scanner, according to one illustrated implementation.

FIG. 6 shows an example graphical user interface 600 for the configuration tool 502 shown in FIG. 5. The graphical user interface 600 includes a dust or clutter settings section 602 which includes a graphical plan view section 604, an operational parameters input section 606, a teach-in phase configuration section 608, and a test phase configuration section 610.

The operational parameters input section 606 allows a user to input operational parameters for the laser scanner including response time 612, detection capability 614, and maximum distance 616. Each of these parameters is discussed above. Next to each of the operational parameters, a "not to be changed" box 618 is provided which allows the user to indicate which, if any, of the operational parameters should not be autonomously changed by the configuration tool. By indicating that one of the parameters should not be changed, the user gives priority to that parameter so the system may optimize the clutter filter for that parameter while adjusting the other two parameters to possibly be sub-optimal.

The teach-in phase configuration section 608 allows a user to select a duration for a teach-in phase. The teach-in phase configuration section 608 also includes inputs which allow the user to start, stop, and pause the teach-in phase. Similarly, the test phase configuration section 608 allows a user to start and stop a test phase, and to view the results of a test phase. The test phase configuration section 608 may also include a selection box which allows the user to save test results to a log file, for example.

The graphical plan view section 604 of the clutter settings section 602 provides the user with a graphical view of the monitoring area of the laser scanner as configured with particular operational parameters (e.g., response time, detection capability, maximum distance) and a particular clutter filter. A process for selecting and simulating a clutter filter for a laser scanner is discussed below with reference to FIG. 7.

Figure 7:
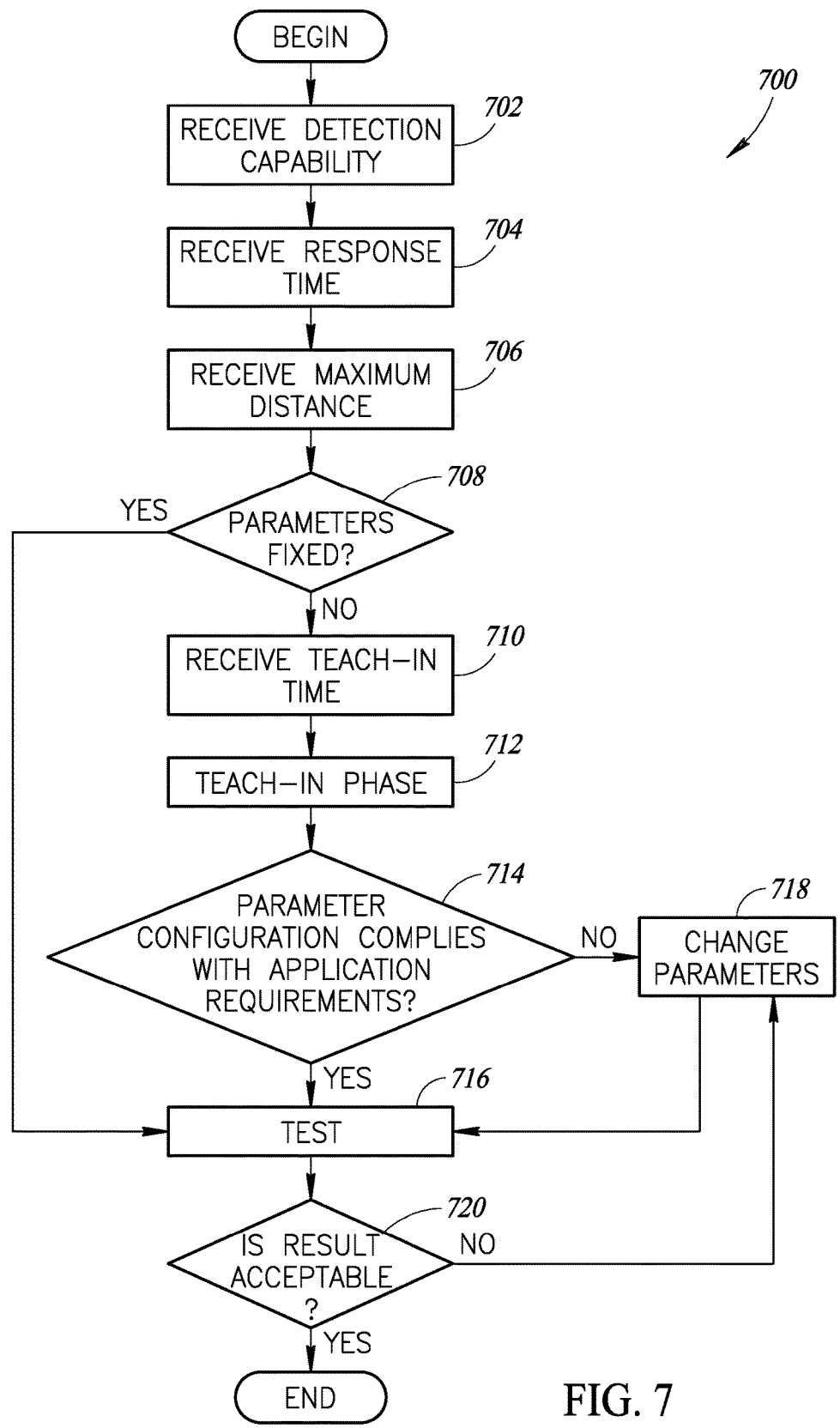
FIG. 7 is a flow diagram for a method of operating a laser scanner configuration system to configure a clutter filter of the laser scanner, according to one illustrated implementation.

FIG. 7 shows a method 700 of operation for a configuration tool of a laser scanner to select a clutter filter for the laser scanner that is suitable for a particular application and operating environment. The method 700 may be implemented during installation of a laser scanner prior to deployment thereof. As another example, the method 700 may be implemented from time-to-time to ensure the laser scanner is properly configured for a particular environment.

At 702, at least one processor of the configuration tool receives a detection capability parameter for the laser scanner which is being configured. As an example, the configuration tool may receive the detection capability parameter via the operational parameters input section 606 of the graphical user interface 600 shown in FIG. 6. At 704, the at least one processor of the configuration tool may receive a response time parameter for the laser scanner. At 706, the at least one processor of the configuration tool may receive the maximum distance or maximum range for the laser scanner.

At 708, the at least one processor of the configuration tool may determine whether any one or more of the operational parameters of the laser scanner are not to be modified during a teach-in phase. For example the at least one processor of the configuration tool may determine whether any of the "not to be changed" boxes 618 in the graphical user interface 600 have been checked by the user, which allows the system to determine that such parameter(s) should remain fixed during the teach-in phase.

At 710, responsive to determining that at least one of the operational parameters is allowed to be modified, the at least one processor of the configuration tool may receive a teach-in phase duration via the graphical user interface. If the teach-in phase duration is set to a relatively short time, the configuration tool is permitted to test different clutter filter settings to understand how each parameter is important to determine the system performance. If the teach in duration is set to a relatively long time (e.g., several hours) the configuration tool is permitted to test how a given clutter filter setting impacts system performance considering the average level of dust in the environment.

At 712, the at least one processor causes the laser scanner to commence a teach-in phase for the determined teach-in duration. As discussed above, the teach-in phase may be started, stopped, and/or paused by the user via the teach-in phase configuration section 608 of the GUI 600 (FIG. 6).

During the teach-in phase, the laser scanner is operated in its environment for a period of time when no hard objects (e.g., personnel) are in the monitored area. During the teach-in phase, the laser scanner scans the monitored area and collects detection data which may be used by the configuration tool to determine the level of clutter in the monitored area and to select appropriate clutter filter parameters for the clutter filter of the laser scanner. As discussed above, the configuration tool may utilize the collected data to simulate or test multiple clutter filter parameters to identify one or more optimal parameters suitable for the particular application and environment.

At 714, subsequent to the teach-in phase, the at least one processor of the configuration tool determines whether of the current parameter configuration complies with the requirements for the particular application. As an example, the configuration tool may present results to the user and request feedback from the user regarding the selection of the clutter filter parameters and/or the operational parameters for the laser scanner.

At 716, if the at least one processor of the configuration tool determines that the current parameter configuration complies with the requirements for the particular application, the configuration tool may initiate a test phase to test the operation of the laser scanner with the selected parameters. At 718, if the at least one processor of the configuration tool determines that the current parameter configuration does not comply with the requirements of the particular application, the configuration tool may autonomously change one or more parameters or may allow the user to change one or more of the parameters.

At 720, subsequent to the test phase, the at least one processor of the configuration tool determines whether the performance results obtained during the test phase are acceptable. For example, the configuration tool may present the test results to the user and request feedback regarding whether the performance results are acceptable.

If the results are acceptable, the method 700 may end until invoked again. If the results are unacceptable, control may return to 718 and the configuration tool may autonomously change one or more parameters or may allow the user to change one or more parameters. The configuration tool may then operate in the test-phase with the modified parameters. This feedback loop may continue until the performance results are acceptable.

Figure 8A:
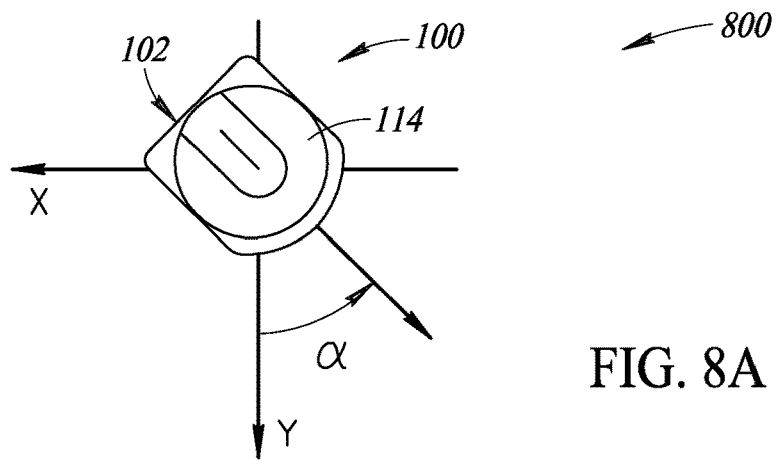
FIG. 8A is a schematic view of a laser scanner showing a plan angle thereof, according to one illustrated implementation.
Figure 8B:
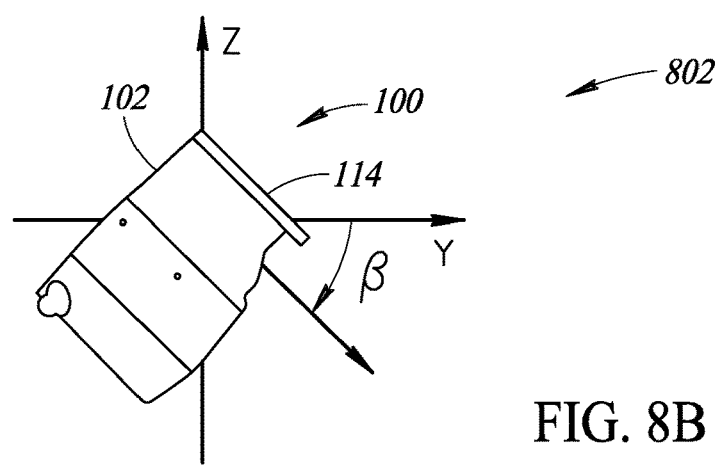
FIG. 8B is a schematic view of a laser scanner showing a vertical angle thereof, according to one illustrated implementation.
Figure 8C:
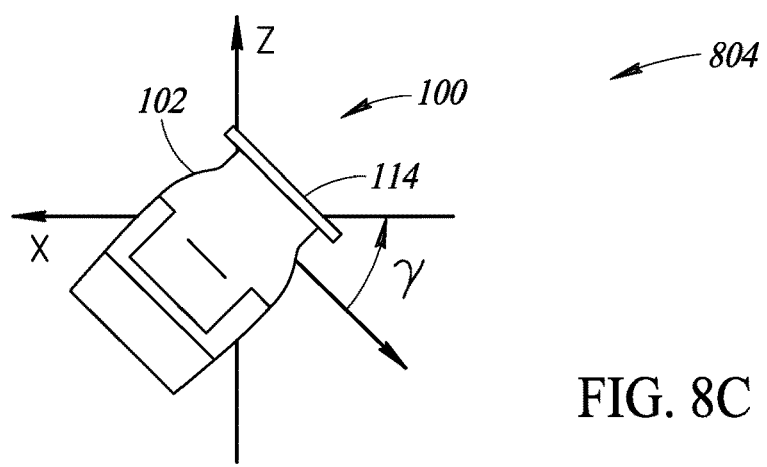
FIG. 8C is a schematic view of a laser scanner showing a tilt angle thereof, according to one illustrated implementation.

FIGS. 8A-8C, 9, and 10 illustrate systems and methods of the present disclosure to autonomously determine the real area which needs to be monitored by a laser scanner in a particular environment. As shown in FIGS. 8A-8C, the laser scanner 100 may not be mounted on a horizontal surface. In such cases, the scanning area of the laser scanner 100 will not be a horizontal plane. Thus, the laser scanner 100 may be mounted at various orientations. FIG. 8A shows a plan angle ($\alpha$) of the laser scanner 100, FIG. 8B shows a vertical angle ($\beta$) of the laser scanner, and FIG. 8C shows a tilt angle ($\gamma$) of the laser scanner. As discussed below, such orientation angles may be utilized to determine a real area that has to be monitored by the laser scanner.

Figure 9:
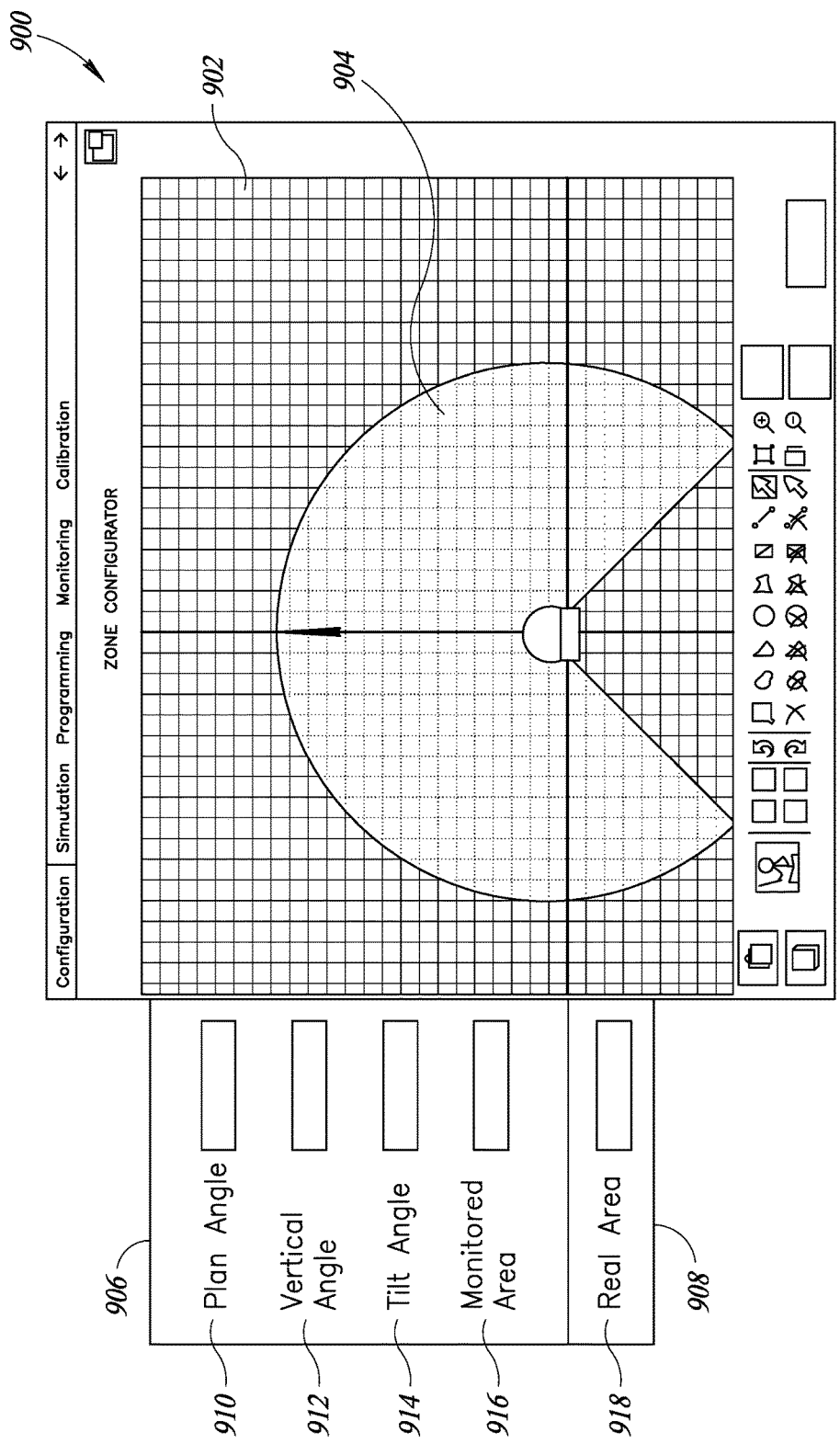
FIG. 9 is a screenshot of a user interface for a laser scanner configuration tool which determines a real area to be monitored by a laser scanner utilizing a floor projection area and orientation angles of the laser scanner, according to one illustrated implementation.

FIG. 9 shows a screenshot of a user interface 900 for a laser scanner configuration tool which determines a real area to be monitored by a laser scanner utilizing a floor projection area and orientation angles of the laser scanner. The GUI 900 includes a plan view section 902 which allows the user to draw a floor projection area 904 for the required floor area to be monitored by the laser scanner. The GUI 900 also includes an input section 906 and an output section 908. The input section 906 includes boxes 910, 912, and 914 which allow the user to input the plan angle, vertical angle, and tilt angle, respectively, of the laser scanner. In some implementations, the input section 906 may also include a box 916 which allows the user to input the floor projection area for the area to be monitored by the laser scanner. The box 916 may be provided in addition to or instead of the plan view section 902 which allows the user to draw the floor projection area 904.

Using the orientation angles and floor projection area to be monitored, at least one processor of the configuration tool may autonomously determine the real area that needs to be monitored by the laser scanner. The determined real area may be presented to the user in a box 918 in the output section 908 of the GUI 900. Additionally, or alternatively, the determined real area may be presented graphically to the user (e.g., via the plan view section 902).

The at least one processor of the configuration tool may determine the real area that needs to be monitored by performing a geometric transformation between a horizontal plane (i.e., floor projection plane) and the scanning plane of the laser scanner when oriented at the orientation angles α, β and γ specified by the user.

Figure 10:
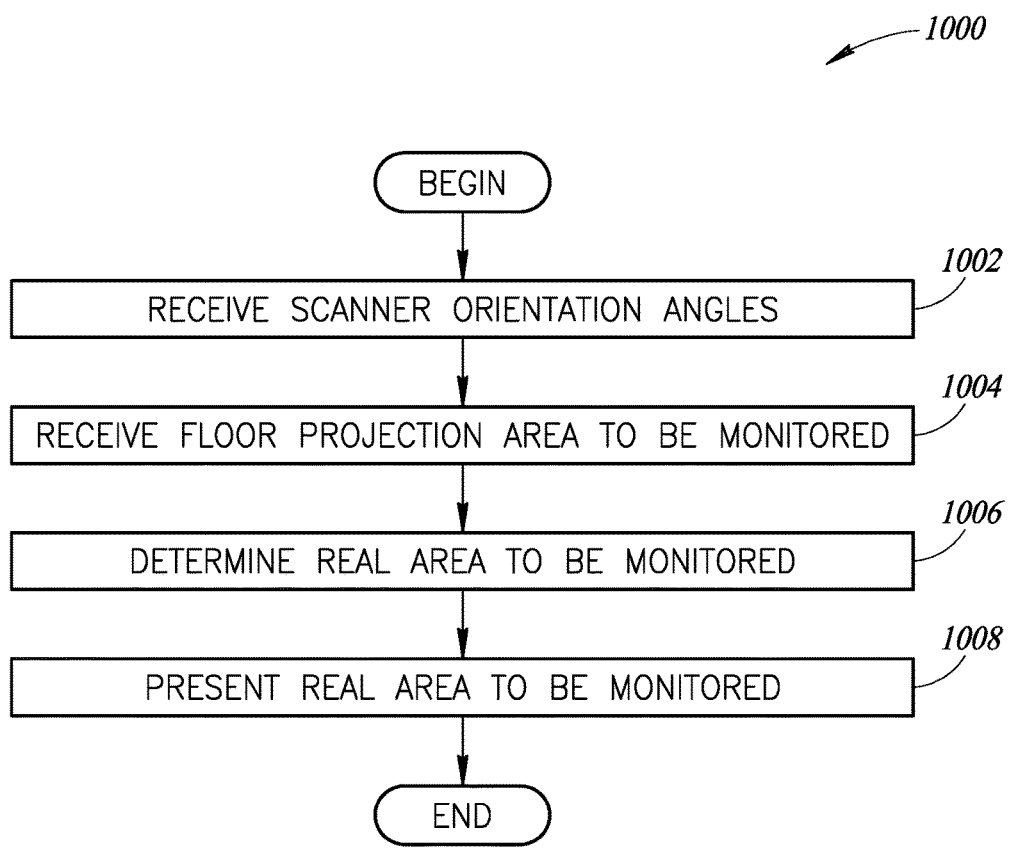
FIG. 10 is a flow diagram for a method of operating a laser scanner configuration system to determine a real area to be monitored by a laser scanner, according to one illustrated implementation.

FIG. 10 shows a method 1000 of operating a laser scanner configuration system to autonomously determine a real area to be monitored by a laser scanner when the laser scanner is mounted at a sloped, non-horizontal, orientation. At 1002, at least one processor of a configuration tool may receive orientation angles α, β and γ for a laser scanner via a suitable user interface (e.g., GUI 900 of FIG. 9). At 1004, the at least one processor of the configuration tool may receive a floor projection area to be monitored by the laser scanner via a user interface. At 1006, the at least one processor of the configuration tool may determine the real area to be monitored using the received orientation angles and received floor projection area. At 1008, the at least one processor of the configuration tool may present the real area to be monitored via a user interface (e.g., GUI 900 of FIG. 9).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operating a laser scanner configuration system to configure a clutter filter of a laser scanner, the method comprising:
    receiving, by at least one processor via a user interface, operational parameters for the laser scanner, the operational parameters comprising at least a maximum detection distance, a response time, and a detection capability of the laser scanner;
    receiving, by the at least one processor via the user interface, an indication of whether at least one of the operational parameters of the laser scanners is permitted to be autonomously modified;
    responsive to receiving an indication that at least one of the operational parameters is permitted to be autonomously modified,
        causing, by the at least one processor, the laser scanner to operate in an environment for a period of time;
        receiving, by the at least one processor, detection data from the laser scanner, the detection data obtained by the laser scanner during operation thereof during the period of time;
        optimizing, by the at least one processor, clutter filter parameters of the clutter filter of the laser scanner utilizing the received detection data, wherein optimizing the clutter filter parameters of the clutter filter comprises modifying at least one of the operational parameters which is permitted to be autonomously modified; and
        presenting, by the at least one processor via the user interface, the modified operational parameters; and
    autonomously adjusting the laser scanner to an optimum set of operational parameters by implementing the modified operational parameters presented by the at least one processor.

2. The method of claim 1, further comprising:
    simulating, by the at least one processor, performance of the laser scanner as configured with the modified operational parameters; and
    presenting, by the at least one processor via the user interface, data indicative of the results of the simulation.

3. The method of claim 2, further comprising:
    responsive to the presenting of data indicative of the results of the simulation, receiving, by the at least one processor via the user interface, a modification of at least one of the operational parameters.

4. The method of claim 3, further comprising:
    responsive to receiving a modification of at least one of the operational parameters,
        simulating, by the at least one processor, performance of the laser scanner configured with the modified operational parameters; and
        presenting, by the at least one processor via the user interface, data indicative of the results of the simulation.

5. The method of claim 1, further comprising:
    receiving, by the at least one processor via the user interface, teach-in phase duration data, the teach-in phase duration data indicative of a duration of the period of time the laser scanner is caused to operate in the environment.

6. The method of claim 1 wherein optimizing clutter filter parameters of the clutter filter comprises optimizing clutter filter parameters of the clutter filter which includes at least one of a temporal filter or a spatial filter.

7. The method of claim 1, further comprising:
    receiving, by the at least one processor via the user interface, a pause command while the laser scanner is operating in the environment during the period of time; and
    responsive to receiving the pause command, causing the laser scanner to cease operation in the environment.

8. The method of claim 1 wherein optimizing clutter filter parameters of the clutter filter comprises utilizing the received detection data from the laser scanner to assess a plurality of different combinations of clutter filter parameters for the clutter filter.

9. The method of claim 1, further comprising:
    receiving, by the at least one processor via the user interface, a set of orientation coordinates for the laser scanner;
    receiving, by the at least one processor via the user interface, a floor projection area value for the laser scanner indicative of the floor projection area to be monitored by the laser scanner;
    determining, by the at least one processor, a real area value to be monitored by the laser scanner based at least in part on the received set of orientation coordinates and the received floor projection area value; and
    presenting, by the at least one processor via the user interface, the determined real area value.

10. The method of claim 9 wherein receiving a set of orientation coordinates comprises receiving a plan angle, a vertical angle and a tilt angle of the laser scanner.

11. The method of claim 9 wherein presenting the determined real area comprises graphically presenting the determined real area on a display.

12. The method of claim 9 wherein receiving a floor projection area value for the laser scanner comprises receiving a graphical representation of a floor projection area value via a graphical user interface.

13. A laser scanner configuration system, comprising:
at least one processor; and
at least one nontransitory processor-readable storage medium communicatively coupled to the at least one processor and which stores at least one of processor-executable instructions or data that, when executed by the at least one processor, cause the at least one processor to:
receive, via a user interface, operational parameters for a laser scanner, the operational parameters comprising at least a maximum detection distance, a response time, and a detection capability of the laser scanner;
receive, via the user interface, an indication of whether at least one of the operational parameters of the laser scanners is permitted to be autonomously modified;
responsive to receipt of an indication that at least one of the operational parameters is permitted to be autonomously modified,
cause the laser scanner to operate in an environment for a period of time;
receive detection data from the laser scanner, the detection data obtained by the laser scanner during operation thereof during the period of time;
optimize clutter filter parameters of a clutter filter of the laser scanner utilizing the received detection data, wherein optimization of the clutter filter parameters of the clutter filter comprises a modification at least one of the operational parameters which is permitted to be autonomously modified; and
present, via the user interface, the modified operational parameters; and
adjust the laser scanner to an optimum set of operational parameters by implementing the modified operational parameters presented by the at least one processor.

14. The laser scanner configuration system of claim 13 wherein the at least one processor:
simulates performance of the laser scanner as configured with the modified operational parameters; and
presents, via the user interface, data indicative of the results of the simulation.

15. The laser scanner configuration system of claim 14 wherein the at least one processor:
responsive to the presentation of data indicative of the results of the simulation, receives, via the user interface, a modification of at least one of the operational parameters.

16. The laser scanner configuration system of claim 15 wherein the at least one processor:
responsive to receipt of a modification of at least one of the operational parameters,
simulates performance of the laser scanner configured with the modified operational parameters; and
presents, via the user interface, data indicative of the results of the simulation.

17. The laser scanner configuration system of claim 13 wherein the at least one processor:
receives, via the user interface, teach-in phase duration data, the teach-in phase duration data indicative of a duration of the period of time the laser scanner is caused to operate in the environment.

18. The laser scanner configuration system of claim 13 wherein the clutter filter comprises at least one of a temporal filter or a spatial filter.

19. The laser scanner configuration system of claim 13 wherein the at least one processor:
receives, via the user interface, a pause command while the laser scanner is operating in the environment during the period of time; and
responsive to receipt of the pause command, causes the laser scanner to cease operation in the environment.

20. The laser scanner configuration system of claim 13 wherein the at least one processor:
utilizes the received detection data from the laser scanner to assess a plurality of different combinations of clutter filter parameters for the clutter filter.

21. The laser scanner configuration system of claim 13 wherein the at least one processor:
receives, via the user interface, a set of orientation coordinates for the laser scanner;
receives, via the user interface, a floor projection area value for the laser scanner indicative of the floor projection area to be monitored by the laser scanner;
determines a real area value to be monitored by the laser scanner based at least in part on the received set of orientation coordinates and the received floor projection area value; and
presents, via the user interface, the determined real area value.

22. The laser scanner configuration system of claim 21 wherein receiving a set of orientation coordinates comprises receiving a plan angle, a vertical angle and a tilt angle of the laser scanner.

23. The laser scanner configuration system of claim 21 wherein presenting the determined real area comprises graphically presenting the determined real area on a display.

24. The laser scanner configuration system of claim 21 wherein receiving a floor projection area value for the laser scanner comprises receiving a graphical representation of a floor projection area value via a graphical user interface.

25. A method of operating a laser scanner configuration system to configure a clutter filter of a laser scanner, the method comprising:
causing, by at least one processor, a laser scanner communicatively coupled to the at least one processor to operate in an environment for a period of time;
receiving, by the at least one processor, detection data from the laser scanner, the detection data obtained by the laser scanner during operation thereof during the period of time;
optimizing, by the at least one processor, clutter filter parameters of the clutter filter of the laser scanner utilizing the received detection data, wherein optimizing the clutter filter parameters of the clutter filter comprises modifying at least one operational parameter of a plurality of operational parameters of the laser scanner, the plurality of operational parameters includes at least a maximum detection distance, a response time, and a detection capability of the laser scanner;

presenting, by the at least one processor via a user interface, the modified operational parameters associated with the optimized clutter filter parameters;

simulating, by the at least one processor, performance of the laser scanner as configured with the modified operational parameters;

presenting, by the at least one processor via the user interface, data indicative of the results of the simulation; and adjusting the laser scanner to an optimum set of operational parameters by implementing the modified operational parameters presented by the at least one processer.

\* \* \* \* \*